United States Patent [19]

Hochreuter

[11] 3,968,315

[45] July 6, 1976

[54] QUATERNARY AMMONIUM ANTISTATIC AGENTS

[75] Inventor: Richard Hochreuter, Oberwil, Switzerland

[73] Assignee: Sandoz Ltd., Basel, Switzerland

[22] Filed: Nov. 13, 1974

[21] Appl. No.: 523,264

[30] Foreign Application Priority Data

Nov. 20, 1973  Switzerland.................... 16334/73

[52] U.S. Cl. ............................ 428/474; 260/459 A; 260/567.6 P; 427/394; 428/480
[51] Int. Cl.² ......................................... B05D 3/02
[58] Field of Search ................. 260/459 A, 567.6 P; 427/394, 395; 428/474, 480

[56] References Cited
UNITED STATES PATENTS 3,113,956  12/1963  Robinette ...................... 260/459 A
3,299,138  1/1967  Sveum et al.................. 260/567.6 P

*Primary Examiner*—Michael R. Lusignan
*Attorney, Agent, or Firm*—Gerald D. Sharkin; Richard E. Vila; Thomas C. Doyle

[57] ABSTRACT

The invention concerns a novel method of reducing the tendency of material to accumulate static electricity which comprises antistatically treating said material with a water soluble or readily water-dispersible salt having a cation of the formula:

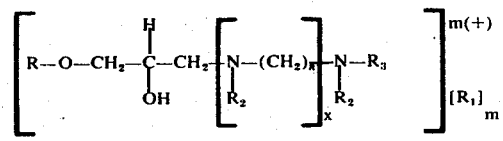

wherein $R_1$, $R_2$, and $R_3$ are substituents e.g. alkyl and $m$, $n$, and $x$ are integers.

18 Claims, No Drawings

QUATERNARY AMMONIUM ANTISTATIC AGENTS

The invention relates to a method of treating materials to reduce the tendency thereof to accumulate electricity, especially during finishing or other processing thereof, and more specifically to the use of quarternary ammonium salts in such method.

Accordingly, the present invention provides a method of reducing the tendency of material to accumulate static electricity which comprises antistatically treating said material with a water soluble or readily water-dispersible salt having a cation of formula I

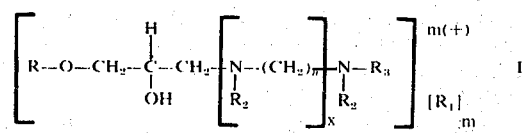

wherein
R is $C_8-C_{14}$ alkyl, $C_8-C_{14}$ alkenyl or mono- or di-$C_4-C_9$ alkyl phenyl,
each $R_1$ is bound to an amino centre, and is, independently, methyl, ethyl or benzyl,
each $R_2$ is, independently, methyl, ethyl, a group $-(CH_2CH_2O)_{q1}-H$ wherein $q^1$ is an integer 1 to 20, or a group $-(CHR_4-CHR_4-O)_{q2}-H$ wherein one $R_4$ is hydrogen and the other is methyl and $q^2$ is an integer 1 to 20,
$R_3$ has one of the significances of $R_2$ or is a group

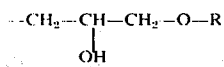

wherein
R is defined above
$m$ is an integer 1 to 4
$n$ is an integer 3 to 6 and
$x$ is an integer 2 or 3
with the provisos that
i. at least one $R_2$ and $R_3$ is a group

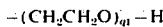

or a group

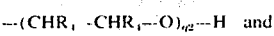

ii. the sum of all the integers $q^1$ and $q^2$ in the molecule is an integer 3 to 20.

When R is alkyl or alkenyl, this may be either straight or branched chain, preferably straight chain.

Preferably R is alkyl, especially $C_{10}-C_{14}$ alkyl, particularly $C_{12}$ alkyl.

The $R_1$'s may be bound to all or only some of the amino centres. Preferably however the $R_1$'s are bound to all of the amino centres, i.e. the integer $m$ corresponds to the sum of the integer $x + 1$. Preferably $R_1$ is methyl or ethyl, especially methyl.

Preferably at least one and preferably both of the significances $R_2$ and $R_3$ are the group $(CH_2CH_2O)_{q1}-H$.

The sum of the integers $q^1$ and $q^2$ in the molecule may lie in the range 3 to 20, preferably 3 to 10, e.g. 3 to 5 and is especially 4.

The integer $n$ preferably lies in the range 3 to 5, e.g. 3 or 4, and is especially 3.

The anion of the salts employed in the method of the present invention is determined only by the water solubility or dispersibility, especially the former, of the salt. Thus the anion must not form with the cation, complexes that are not readily soluble or dispersible in water. Examples of suitable anions are $Cl^-$, $Br^-$, $I^-$, $CH_3SO_4^-$ and $C_2H_5SO_4^-$, especially the anions $Cl^-$ and $CH_3SO_4^-$.

Accordingly the preferred salt for use in accordance with the invention is the salt of formula Ia

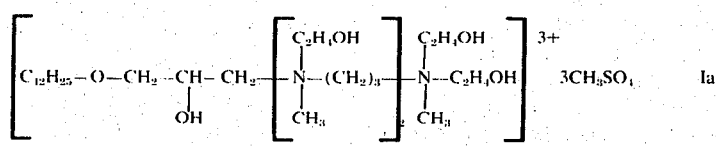

The salts are preferably applied to the material to be treated in aqueous solution or dispersion form. The material to be treated is of porous, especially fibrous, form such as paper or, in particular, carpets, non-woven fabrics or textile materials of polyamides, or polyesters or polyacrylonitrile. The textile materials may be treated in the form of threads or fabrics.

The material to be treated is impregnated with an aqueous solution of the salt by the exhaust process, or more preferably, by the padding process. The salts are preferably applied in quantities of 0.05 to 2%, in particular of 0.1 to 0.5% based on the weight of the treated materials. They may be used in conjunction with other finishing preparations.

The salts to be used in accordance with the invention are produced in manner known per se, for example by reacting stoichiometrically 1 or 2 mols of a compound of formula ROH, wherein R is defined above, with an equimolar amount of epichlorohydrin or epibromohydrin, especially epichlorohydrin, with 1 mol of a polyalkylene polyamine of formula II

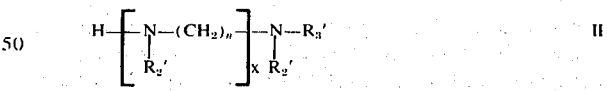

wherein $R_2'$ and $R_3'$ are H, methyl or ethyl groups, and at least one of the $R_2'$ or $R_3'$ signifies H,
treating the resulting product with $q$ (i.e. $1^1+q^2$) moles of ethylene and/or propylene oxide, subsequently reacting with $m$ mols of quaternizing agent to bind a suitable $R_1$ group to the nitrogen atoms, $R_1$ being as defined above, and converting the resulting product into the compound of formula I, wherein R, $R_1$, $R_2$, $R_3$, $m$, $q_1$, $q_2$, $n$ and $x$ are as defined above.

The compounds of formula ROH may be alcohols with straight chain or branched alkyl or alkenyl radicals of 8 to 14 carbon atoms, e.g. octyl alcohol, lauryl alcohol, myristyl alcohol, also the predominantly primary synthetic alcohols of the Dobanol type with 8 to 14 carbon atoms as well as tridecyl alcohol and the secondary synthetic alcohols of the Dergitol S-type of approximately 8 to 12 carbon atoms. Aromatic compounds such as amyl phenol, diamyl phenol, nonyl phenol or dinonyl phenol may also be used for the compounds of formula ROH.

Examples of suitable polyalkylene polyamines of formula II are dipropylene triamine, tripropylene tetraamine, dihexylene triamine, trihexylene tetraamine, bis-(3-aminopropyl)-methyl amine, bis-(3-aminopropyl)-ethyl amine, N', N'''-dimethyl dibutylene triamine.

Ethylene oxide is preferably used for oxalkylation but propylene oxide or a mixture of both epoxides are also suitable.

Quaternization is carried out with methyl, ethyl or benzyl halides, whereby the halogen atom may be bromine or iodine but is preferably chlorine. Dimethyl sulphate or diethyl sulphate are also used, dimethyl sulphate being preferred.

More specifically, the compounds of formula I are produced in manner known per se by first reacting the compound of the above-mentioned formula ROH with the epihalohydrin, preferably in the presence of tin tetrachloride or boron trifluoride etherate at 20° to 120°C, in particular at 70° to 100°C, and then reacting the resulting chlorohydrin ether at 20° to 140°C with the polyalkylene polyamine of formula II. The reaction product obtained is subsequently alkoxylated with ethylene and/or propylene oxide. The reaction temperature used may vary widely but is preferably between approximately 80° to 140°C. Quaternization is carried out in the presence of approximately 1 mol of an alkali hydroxide based on 1 mol of an alkylene oxide adduct, using, for example, dimethyl sulphate in aqueous solution and conveniently at room temperature. Quaternization may, however, also be carried out at a higher temperature, i.e. up to approximately 120°C.

The salts according to the invention are obtained in the form of water soluble or readily water dispersible products. Compared with the known cationic compounds, for example, 1-hydroxy ethyl-2-heptadecenyl imidazoline, they generally have a notable antistatic effect and salt stability. They do not influence the shade of dyings, show no thermomigration of disperse dyes and exhibit a reduced dry-soiling.

In the Examples, the temperatures are in degrees centigrade and the parts and percentages are by weight.

EXAMPLE 1

A polyamide fabric is treated on the padder with an aqueous solution which contains per liter 10 parts of the quaternization product described below. It is then expressed to an increase in weight of approximately 65% and dried at 100°.

To test the antielectrostatic effect, the samples are left for 48 hours at 20° and 40% relative atmospheric humidity and the field decay half-value time is then determined. This is carried out with a static voltmeter, the test sample is given a charge of 100 volts and the time it takes for the voltage to go down to half of its original value is measured. The antielectrostatic effect proved to be very favourable. The product used was produced as follows: 3.7 Parts of tin tetrachloride were added to 372 parts of lauryl alcohol (a) and this was then reacted with 185 parts of epichlorohydrin (b) at 80°–85°C. After cooling to 25°–30°, the whole was reacted with 145 parts of bis-(3-aminopropyl)-methyl amine (c). The resulting amine derivative was then heated at 110°C and reacted with 264 parts of ethylene oxide (d). The ethylene oxide adduct was subsequently quaternized at 60°–65°C with 378 parts of dimethyl sulphate (e). The relative molar ratios were a:b:c:d:e = 2:2:1:6:3. The quaternization product is obtained in the form of a viscous, paste-like mass.

EXAMPLE 2

A polyamide fabric is treated on the padder at 20°–25°C with an aqueous solution which contains per liter 20 parts of the quaternary ammonia compound described below. The fabric is expressed to an increase in weight of approximately 70% and dried at 100°C.

The antielectrostatic activity of the fabric thus finished is determined as described in Example 1 and is very favourable. The quaternization product is produced as follows: 1.9 Parts of tin tetrachloride are added to 186 parts of lauryl alcohol (a) and reacted with 92.5 parts of epichlorohydrin (b) at 75°–80°C. The chlorohydrine ether is then reacted with 131 parts of dipropylene triamine (c) at 25°–35°C. The resulting amine derivative is subsequently heated to 110°C and reacted with 176 parts of ethylene oxide (d). The ethoxylation product is then dissolved in 2620 parts of water, 133 parts of 30% caustic soda solution are added and the whole is alkylated at 30°–35°C with 378 parts of dimethyl sulphate (e). The relative molar ratios are a:b:c:d:e =1:1:1:4:3:. The quaternization product is a clear, slightly yellowish solution and has the structure of formula II.

Similar results are obtained by processing as described above but using 440 parts instead of the 176 parts of ethylene oxide mentioned above.

The relative molar ratios are then a:b:c:d:e = 1:1:1:10:3. The same results are obtained by using 153 parts of methyl chloride (f) instead of 378 parts of dimethyl sulphate as quaternizing agent and in this case the ethoxylation product is methylated at 95°–100°C. The relative molar ratios are a:b:c:d:f: = 1:1:1:4:3.

EXAMPLE 3

Polyester fabric is treated on the padder with an aqueous solution which contains per liter 2.5 parts of the quaternization product described below. It is then expressed to an increase in weight of approximately 70% and dried. The antielectrostatic activity of the fabric thus finished is determined as described in Example 1 and is very favourable. The quaternization product used is produced as follows: 346 parts of dinonyl phenol (a) are reacted in the presence of 3.4 parts of tin tetrachloride at 80° with 92.5 parts of epichlorohydrin (b). The chlorohydrine ether is then reacted at 30°C with 131 parts of dipropylene triamine (c). The amine derivative is subsequently added at 120°C to 176 parts of ethylene oxide (d) and the ethylene adduct quaternized at 60°–70° with 378 parts of dimethyl sulphate (e). The relative molar ratios are a:b:c:d:e = 1:1:1:4:3. The product is obtained as a viscous yellowish mass.

EXAMPLE 4

Polyamide fabric is treated on the padder with an aqueous solution which contains per liter 10 parts of the quaternization product described below. It is expressed to an increase in weight of 65% and dried at 80°–100°C. The antielectrostatic activity of the fabric thus finished is very good.

The quaternization product used is obtained in a similar way to that described in Example 1 by reacting 186 parts of lauryl alcohol (a) with 92.5 parts of epichlorohydrin (b), 188 parts of tripropylene tetraamine (c), 176 parts of ethylene oxide (d) and 504 parts of dimethyl sulphate (e). The relative molar ratios are a:b:c:d:e = 1:1:1:4:4.

EXAMPLE 5

Polyamide fibres are treated at 60° with an aqueous solution which contains per liter 10 parts of the quaternization product described below. They are expressed to an increase in weight of 60% and dried at 100°. The fibres thus finished show a very favourable antielectrostatic activity. The quaternization product used was produced as follows: 130 Parts of octyl alcohol (c) are reacted as described in Example 1 with 92.5 parts of epichlorohydrin (b) and 131 parts of dipropylene triamine (c). The amine derivative is than reacted at 100°C with 580 parts of propylene oxide (d). The propoxylation product is subsequently quaternized at 60°–65°C with 378 parts of dimethyl sulphate (e). The relative molar ratios are: a:b:c:d:e = 1:1:1:10:3.

EXAMPLE 6

Polyamide fabric is treated at 20–25° on the padder with an aqueous solution which contains per liter 5 parts of the quaternization product described below. The fabric is then expressed to an increase in weight of 70% and dried at 100°. The antielectrostatic activity of the fabric thus finished is determined as described in Example 1 and is very favourable.

The quaternization product is produced as described below: 372 Parts of lauryl alcohol (a) are reacted in the presence of 3.7 parts of tin tetrachloride with 185 parts of epichlorohydrin (b) at 80°C and then at 40°C with 216 parts of bis-(6-aminohexyl)-amine (c). The amine derivative is subsequently reacted at 120°–130°C with 264 parts of ethylene oxide (d) and then quaternized at 60°C with 328 parts of dimethyl sulphate (e). The relative molar ratios are: a:b:c:d:e = 2:2:1:6:3.

What is claimed is:

1. A method of reducing the tendency of material to accumulate static electricity which comprises impregnating a porous material having such tendency with an aqueous solution or dispersion of a salt having a cation of the formula

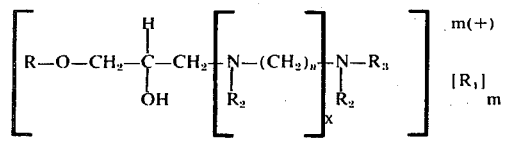

wherein

R is $C_8$–$C_{14}$ alkyl, $C_8$–$C_{14}$ alkenyl or mono- or di-$C_4$–$C_9$ alkyl phenyl, each $R_1$ is bound to an amino centre, and is, independently, methyl, ethyl or benzyl, each $R_2$ is, independently, methyl, ethyl, a group —$(CH_2CH_2O)_{q^1}$—H wherein $q^1$ is an integer 1 to 20, or a group —$(CHR_4CHR_4-O)_{q^2}$—H wherein one $R_4$ is hydrogen and the other is methyl and $q^2$ is an integer 1 to 20, $R_3$ has one of the significances of $R_2$ or is a group

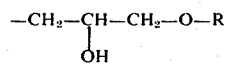

wherein R is defined above, $m$ is an integer 1 to 4, $n$ is an integer 3 to 6 and, $x$ is an integer 2 or 3, with the provisos that i. at least one $R_2$ and $R_3$ is a group

or a group

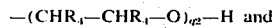

ii. the sum of all the integers $q^1$ and $q^2$ in a molecule is an interger 3 to 20.

2. A method according to claim 1 wherein R is alkyl or alkenyl ($C_8$–$C_{14}$).

3. A method according to claim 1 wherein R is alkyl ($C_8$–$C_{14}$).

4. A method according to claim 3 wherein R contains 12 carbon atoms.

5. A method according to claim 1 wherein $R_1$ is methyl.

6. A method according to claim 1 wherein $R_2$ and $R_3$ are each a group

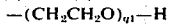

7. A method according to claim 1 wherein the sum of the integers $q^1$ and $q^2$ in the molecule is from 3 to 10.

8. A method according to claim 1 wherein $n$ is 3.

9. A method according to claim 1 wherein $x$ is 2.

10. A method according to claim 1 wherein $m$ is 3.

11. A method according to claim 1 wherein the anion of the salt employed is $CH_3SO_4^-$.

12. A method according to claim 1 wherein the anion of the salt employed is $Cl^-$.

13. A method according to claim 1 wherein a salt of the formula

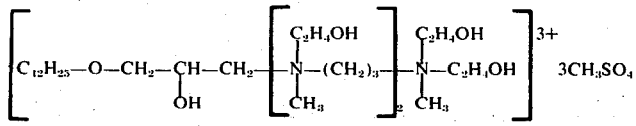

is employed.

14. A method according to claim 1 wherein the material is treated with between 0.05 to 2% of the applied salt, based on the weight of the material.

15. A method according to claim 1 wherein the material comprises polyamide, polyester or polyacrylonitrile.

16. Material wherever treated by a method according to claim 1.

17. A method according to claim 1 wherein there is applied to the material 0.1 to 0.5% of the salt, based on the weight of the material.

18. A method according to claim 15 wherein there is applied to the material 0.1 to 0.5% of the salt, based on the weight of the material.

* * * * *